(12) United States Patent
Kalverkamp

(10) Patent No.: US 7,958,942 B2
(45) Date of Patent: Jun. 14, 2011

(54) POTATO HARVESTER

(75) Inventor: Klemens Kalverkamp, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 248 days.

(21) Appl. No.: 11/968,287

(22) Filed: Jan. 2, 2008

(65) Prior Publication Data

US 2008/0099214 A1 May 1, 2008

Related U.S. Application Data

(63) Continuation-in-part of application No. 11/779,932, filed on Jul. 19, 2007, now abandoned.

(30) Foreign Application Priority Data

Jul. 22, 2006 (DE) .......................... 10 2006 033 974

(51) Int. Cl.
*A01D 13/00* (2006.01)

(52) U.S. Cl. ........................... 171/124; 171/62; 171/140

(58) Field of Classification Search ................ 171/47, 171/62, 103, 104, 124, 139, 125, 126, 140, 171/143, 83, 58, 134, 111, 141, DIG. 1; 172/332, 172/5, 6, 20; 111/903
See application file for complete search history.

(56) References Cited

U.S. PATENT DOCUMENTS

| | | | | |
|---|---|---|---|---|
| 151,778 A * | 6/1874 | Hewitt | ............................. | 172/19 |
| 408,208 A * | 8/1889 | Burger | ............................. | 171/13 |
| 498,885 A * | 6/1893 | Mercer | ............................. | 171/83 |
| 587,725 A * | 8/1897 | Gibbons | ......................... | 171/12 |
| 969,690 A * | 9/1910 | Headland | ........................ | 171/27 |
| 1,293,144 A * | 2/1919 | McKinley | ...................... | 171/110 |
| 1,761,286 A * | 6/1930 | Zuckerman | ..................... | 171/5 |
| 2,110,997 A * | 3/1938 | Mayfield | ....................... | 171/132 |
| 2,417,580 A * | 3/1947 | Young | ............................. | 171/44 |
| 2,488,983 A * | 11/1949 | Packman | ....................... | 171/115 |
| 2,519,761 A * | 8/1950 | Hobbs | ............................. | 172/156 |
| 2,532,169 A * | 11/1950 | Jones | .............................. | 171/20 |
| 2,537,198 A * | 1/1951 | Wetzel et al. | ..................... | 171/5 |
| 2,693,068 A * | 11/1954 | Rodin | ............................. | 171/17 |
| 3,065,800 A * | 11/1962 | Faust et al. | ...................... | 171/98 |
| 3,106,249 A * | 10/1963 | Zachery | ......................... | 171/14 |
| 3,196,599 A * | 7/1965 | Meiners et al. | ............ | 56/10.2 E |
| 3,628,609 A * | 12/1971 | Graybill | ......................... | 171/14 |
| 3,743,023 A * | 7/1973 | Bedwell | .......................... | 171/5 |
| 3,756,322 A * | 9/1973 | Kopasz | ............................ | 171/5 |
| 3,995,570 A * | 12/1976 | van der Lely | ................. | 111/162 |

(Continued)

FOREIGN PATENT DOCUMENTS

DE   25 10 455   9/1976

(Continued)

*Primary Examiner* — Robert E Pezzuto
*Assistant Examiner* — Matthew D Troutman
(74) *Attorney, Agent, or Firm* — Gudrun E. Huckett

(57) ABSTRACT

A potato harvester has a lifting device for lifting soil ridges, wherein the lifting device has a digging device with digging shares. At least one support element for supporting the lifting device on the ground is provided. The at least one support element has at least two wheels that are movable along opposite sides of an intermediately positioned soil ridge, respectively. The wheels form a guide unit that supports at least one part of a weight of the at least one digging device, wherein the guide unit controls the digging shares and acts on a soil ridge to be lifted as an intake aid.

30 Claims, 9 Drawing Sheets

U.S. PATENT DOCUMENTS

| | | | | |
|---|---|---|---|---|
| 4,121,667 A | * | 10/1978 | Curl | 171/110 |
| 4,142,585 A | * | 3/1979 | Bohner et al. | 171/82 |
| 4,416,334 A | * | 11/1983 | Bouillon | 171/27 |
| 4,796,711 A | * | 1/1989 | Chrysler | 171/1 |
| 4,821,807 A | * | 4/1989 | Trumm | 172/6 |
| 4,842,076 A | * | 6/1989 | Welp | 171/124 |
| 5,077,963 A | * | 1/1992 | Harrison et al. | 56/327.1 |
| 5,085,279 A | * | 2/1992 | Kvistgaard | 171/4 |
| 5,181,572 A | * | 1/1993 | Andersen et al. | 172/6 |
| 5,203,148 A | * | 4/1993 | Schreiner et al. | 56/10.2 F |
| 5,248,090 A | * | 9/1993 | Williamson | 239/168 |
| 5,392,863 A | * | 2/1995 | Fixemer | 172/6 |
| 5,655,467 A | * | 8/1997 | Yasuda et al. | 111/100 |
| 6,079,192 A | * | 6/2000 | Rasmussen | 56/10.2 F |

FOREIGN PATENT DOCUMENTS

| | | |
|---|---|---|
| DE | 32 00 924 | 7/1983 |
| DE | 87 00 095.4 | 4/1987 |
| DE | 199 47 484 A1 | 4/2001 |
| GB | 2095085 C2 | 9/1982 |
| JP | 7107828 A1 | 4/1995 |

\* cited by examiner

POTATO HARVESTER

This application is a continuation-in-part application of U.S. patent application Ser. No. 11/779,932 having a filing date of 19 Jul. 2007, the disclosure of which is incorporated by reference in its entirety into the instant application.

BACKGROUND OF THE INVENTION

The invention relates to a potato harvester with a lifting device having at least one digging device for lifting soil ridges containing potatoes, wherein the lifting device comprises one or several digging shares and is supported on the ground by at least one support element.

Potato harvesting machines of known configurations are usually provided with at least one lifting device for lifting the soil ridge with potatoes wherein the lifting device secured on the machine frame is supportable by at least one support element on the ground. According to DE 25 10 455 the machine frame is supported on wheels, and according to DE 32 00 924 A1 a drum that can be placed onto the soil ridge is provided in the area of the lifting device. The potato harvesting machines according to German utility model G 87 00 095.4 and DE 199 47 484 A1 have in the area of the digging share a ground-facing ridge roller or drum. In a single-row harvesting machine according to JP 07 107 828 A, the lifting device that is pivotably supported on the machine frame is provided with guide elements in the form of ridge drums attached with two guide rods, respectively, wherein their contact pressure on the ground can be increased by auxiliary weights provided above the ridge drums.

In a machine according to GB 2 095 085, in a single-row potato digger a depth sensing wheel is provided in the area of the leading edge of the lifting share. It provides depth control and, at the same time, is used for cutting off haulm. Generally, it is proposed also in the relevant literature to provide, in addition to sensing by means of ridge drums or similar components, a support wheel that is entrained without support load in the furrow for depth control of the digging share.

SUMMARY OF THE INVENTION

The invention has the object to provide a potato harvester whose lifting device is provided with a support that is optimal with regard to adjusting and digging processes of the share and, in this connection, enables with minimal technical expenditure an improvement of the digging performance.

The invention solves this object by means of a potato harvester having a support element that is comprised of at least two wheels that are movable along opposite sides of an intermediately positioned soil ridge.

In the area of the lifting device provided with at least one digging device, the potato harvester is provided with a support element that, according to the invention, is formed of at least two wheels that are movable along opposite sides of the intermediately positioned soil ridge and cooperate with one another as a functional unit.

In contrast to generally known ridge drums, sensing wheels or similar support elements provided for depth guiding of lifting devices, the guide unit according to the present invention provided with the two wheels is designed such that in the two furrows adjacent to the at least one soil ridge a support action is provided that takes up the weight force of the lifting device. With minimal expenditure, the wheels are also utilizable for depth adjustment or depth control of the digging share. The wheels that have a transverse spacing adjustable relative to the width of the soil ridge delimit in the digging phase the soil ridge so that for the conveying process a forced guiding action in the manner of an intake channel is provided. The laterally guided dug-up material is introduced in a stabilized mixed stream into the downstream separating stretch so that in this way the feed action of the lifted soil ridge with potatoes into the downstream devices of the machine is improved as a whole. In this connection, these wheels are combined support, guiding and control elements so that the lifting device is provided as a functionally improved module. In addition, the outer ones of the wheels can be provided with cutting elements so that haulm or other plant parts projecting into the lifting area can be cut off.

With a substantially variable design of the connecting component module between the wheels and a support frame of the lifting device, different drive and support configurations as well as corresponding height adjusting and transverse adjusting possibilities of the wheels are conceivable so that the construction as a whole provides a system that is variably adaptable to the digging conditions on site, respectively.

Preferably, the two wheels form a guide unit that supports at least one part of the weight of the digging device, that is provided for controlling the digging share, and that acts on the soil ridge to be lifted as an intake aid.

For a multi-row, preferably four-row, lifting device the number of wheels is greater by one than the number of the soil ridges to be lifted.

The wheels have a diameter selectable in accordance with the digging conditions. Preferably, the wheels have a diameter that is greater relative to the height of the soil ridge by a multiple, in particular is 2.5 times greater. For a multi-row lifting device the wheels have the same diameter, respectively.

Between the wheels forming a row transverse to the travel direction a variable support spacing is provided, in particular the support spacing is adjustable to the spacing of the soil ridges. The wheels can be arranged at different support spacing.

The wheels can be designed to be driven or powered.

The wheels are height-adjustable.

The wheels are adjustable transversely to the travel direction.

The wheels are supportable by transverse adjustment in a furrow provided between the soil ridges.

In the area of the wheels a measuring device is provided with which the lifting depth of the lifting device or of the digging share are controllable.

The lifting device or the digging device in the area of the wheels is provided with at least one sensing unit placeable onto one of the soil ridges.

The lifting device is provided with a linkage module connecting the lifting device to a machine frame, on the one hand, and supporting the wheels in the area of the digging share, on the other hand.

The wheels in the travel direction are supported so as to be rotatable on a transverse axle of the linkage module.

The linkage module that is essentially symmetrically configured relative to the longitudinal center plane of the machine is configured as a frame having two lateral guides and a leading crossbeam such that the lifting device is connected to the machine frame so as to be pivotable as a whole by means of lifting cylinders engaging the guides, respectively, and support bearings provided at a spacing to the lifting cylinders.

The transverse axle centrally supporting the wheels is supported on the linkage module by at least one pivot lever extending radially from the axle such that the transverse axle and the wheels are movable by at least one lifting member.

The transverse axle is connected at the ends in the area of a hinge, respectively, to the linkage module and the lifting members, provided as connectors and embodied in the form of two parallel lifting cylinders, cooperate with the respective pivot levers.

The wheels interact with a measuring device provided for automatic guiding of the lifting device along the soil ridges.

The measuring device has sensors located on the supporting parts of the wheels, respectively.

The measuring device has sensors for detecting lateral forces acting on at least one of the two pivot levers.

At least the outer ones of the wheels interact with a cutting member. As a cutting member a cutting element located on the wheels is provided. As a cutting element an annular disk can be provided that has a cutting edge. The annular disk is connected directly at the end face or centrally on the wheel.

The outer wheel and/or the cutting member are/is adjustable in the direction of the transverse axle and/or of the cutting depth.

BRIEF DESCRIPTION OF THE DRAWINGS

Further details and advantageous configurations of the potato harvester according to the invention result from the following description and the drawings.

DESCRIPTION OF PREFERRED EMBODIMENTS

Figure 1:
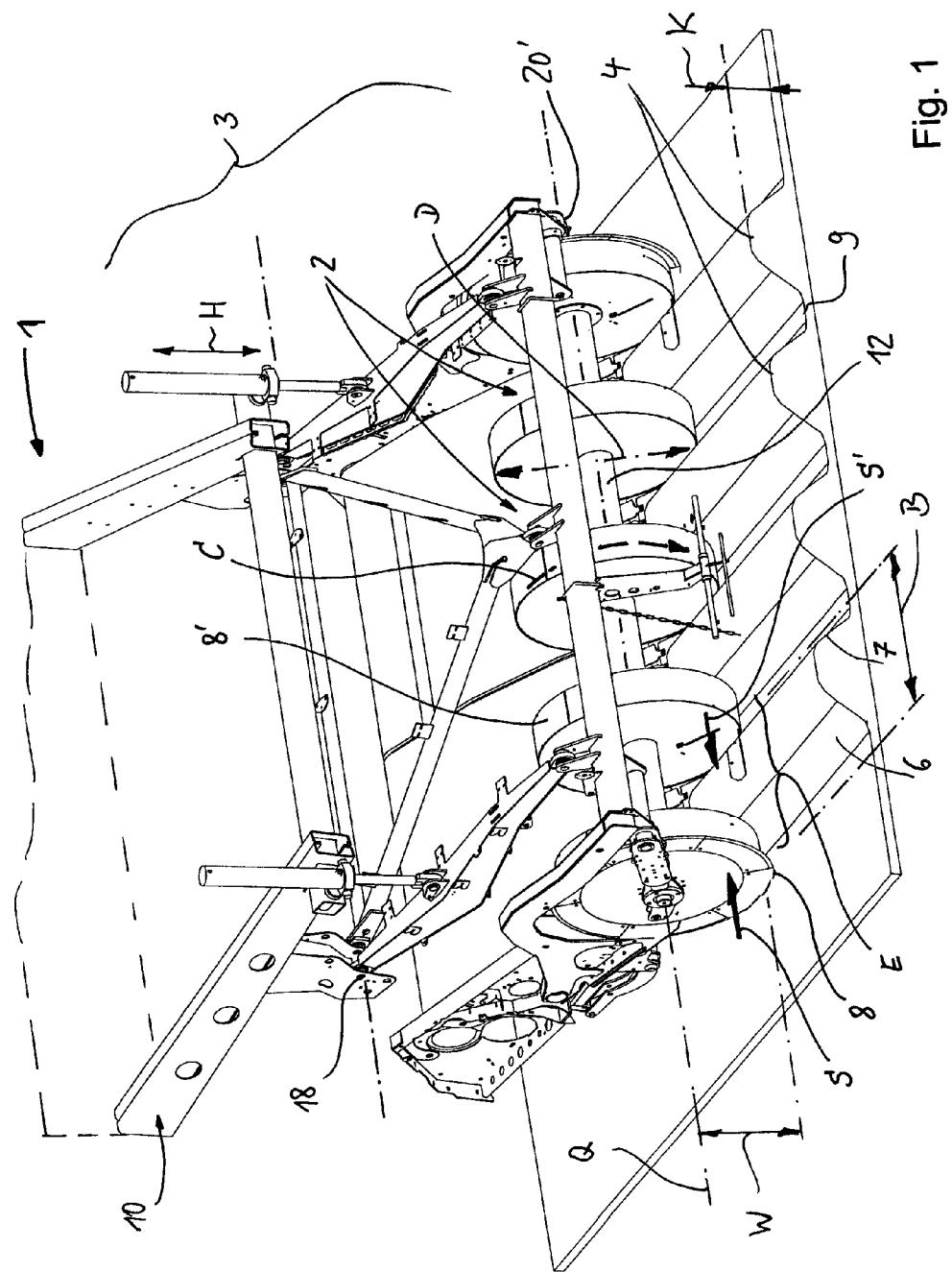
FIG. 1 shows a perspective basic illustration of the potato harvester in the area of the lifting device with wheels according to the invention.

In FIG. 1, a potato harvester referred to as a whole by 1 is illustrated whose configuration is shown only schematically. In the leading area the machine 1 is provided with a lifting device 3 having at least one digging device 2 for lifting soil ridges 4 with potatoes. In known potato harvesting machines 1 of this kind, the lifting device 3 having one or several lifting shares 5 is supported by at least one support element (not illustrated) embodied as a support drum or the like on the ground, in particular in the area of the soil ridge 4.

In accordance with the invention, the potato harvester 1 is provided with a lifting device 3 that comprises at least two wheels 8, 8' that are movable along opposite sides 6, 7 of the intermediately positioned soil ridge 4; the wheels act in the way of multi-functional support elements.

Figure 2:
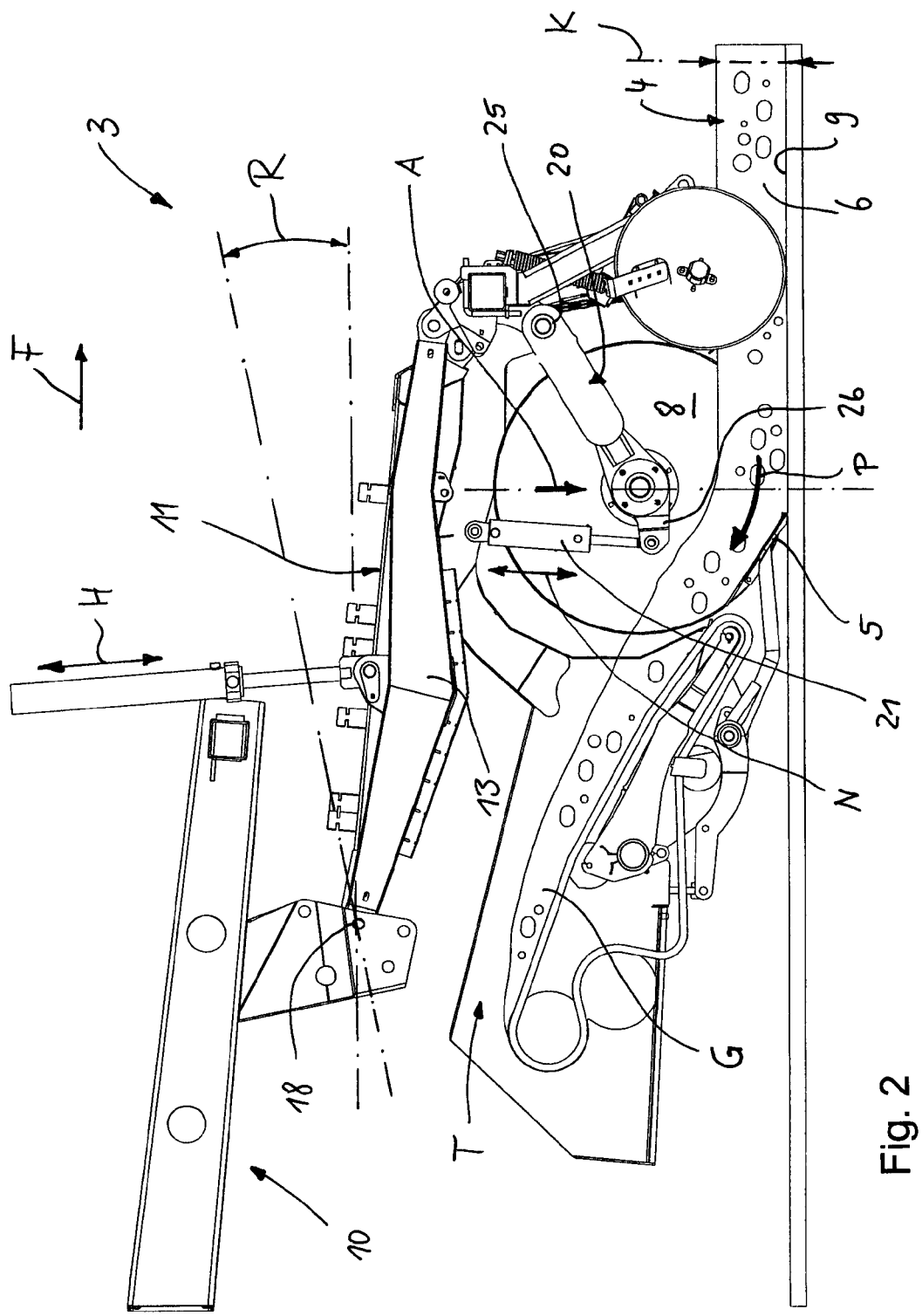
FIG. 2 is a side view of the potato harvester similar to FIG. 1 showing a lifting phase of one of the soil ridges.
Figure 3:
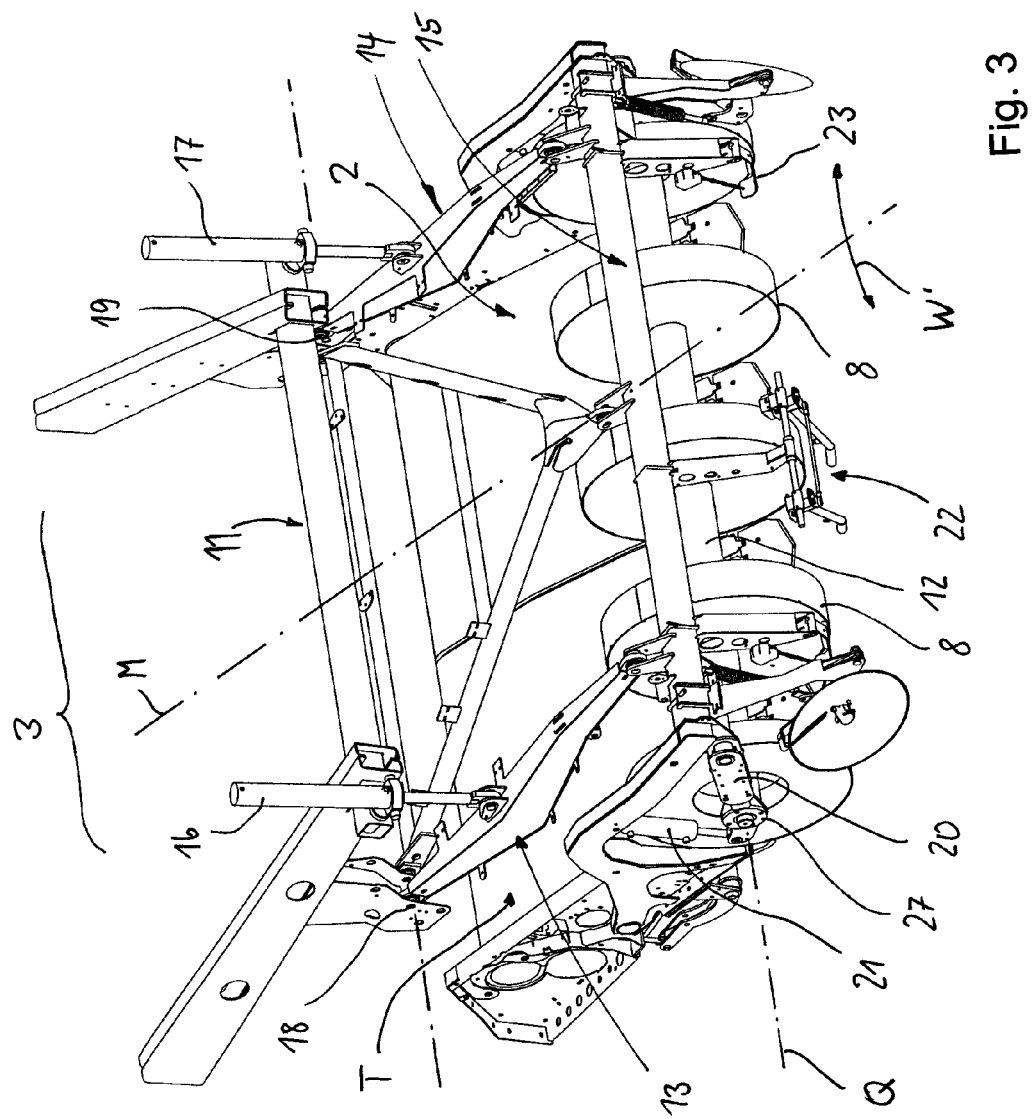
FIG. 3 is a perspective illustration of the lifting device similar to FIG. 1 with additional modules in the area of the wheels.

In the configuration of the potato harvester 1 illustrated in FIGS. 1 through 5, the lifting device 3 is a multi-row component module. In this multi-row, preferably four-row, lifting device 3 the number of wheels 8 cooperating in pairs with one another is greater by one than the number of soil ridges 4 to be lifted so that in this configuration for digging four soil ridges 4 with potatoes a lifting device 3 results with five wheels 8 arranged sequentially in a direction transverse to the travel direction F (FIG. 1, FIG. 3).

The two wheels 8, 8' that cooperate with one another, respectively, thus form a guide unit E. The guide unit E supports at least one portion of the weight force A of the digging device 2 and is provided for controlling the digging shares 5. Moreover, the guide unit E acts on the soil ridge 4 to be lifted as an intake aid. In the illustrated embodiment comprising five wheels 8, the weight force A is distributed accordingly across several rows so that the surface pressure of each wheel 8 on the ground is reduced by the correlated distribution.

Figure 4:
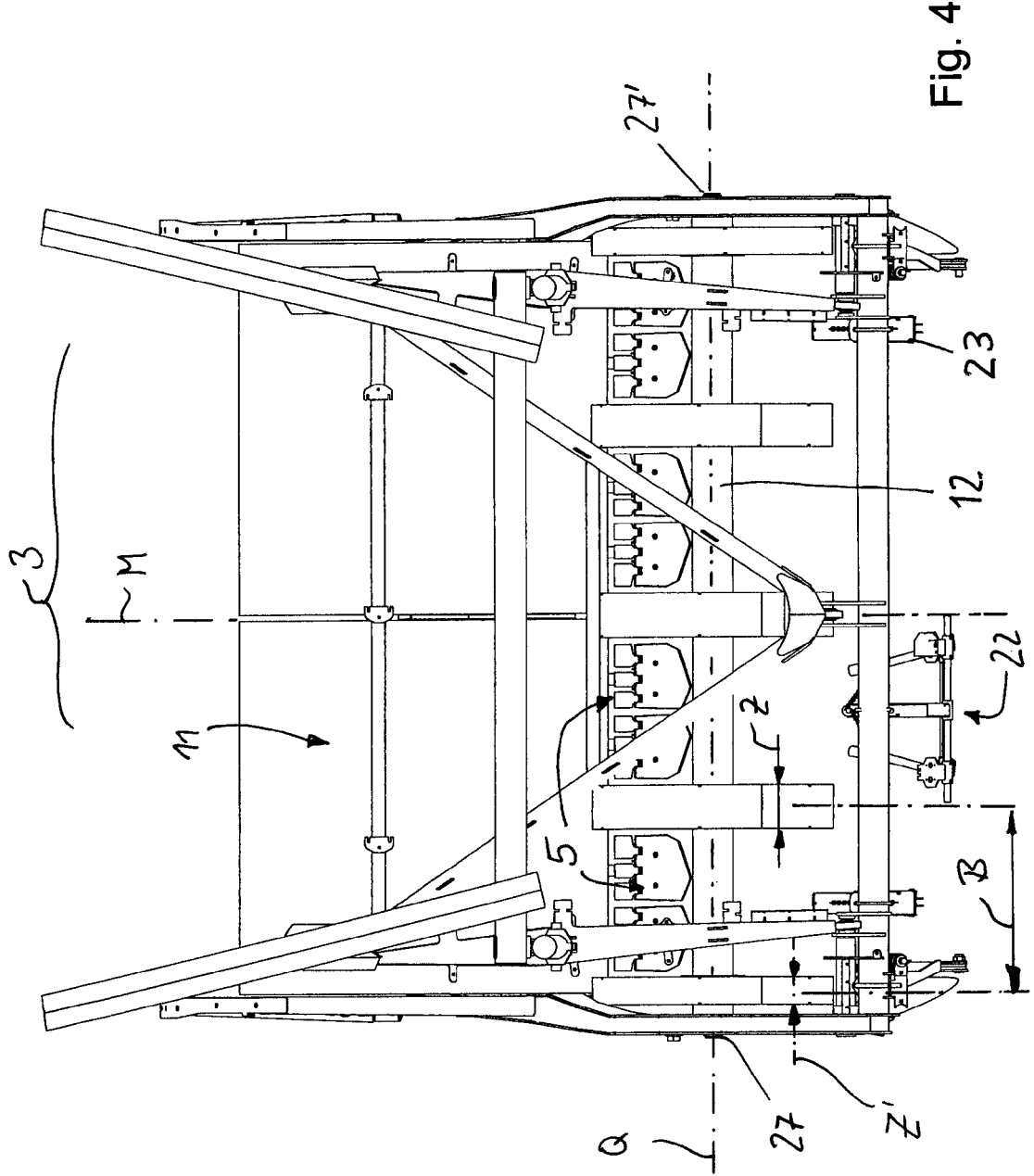
FIG. 4 shows a plan view of the lifting device according to FIG. 3.
Figure 5:
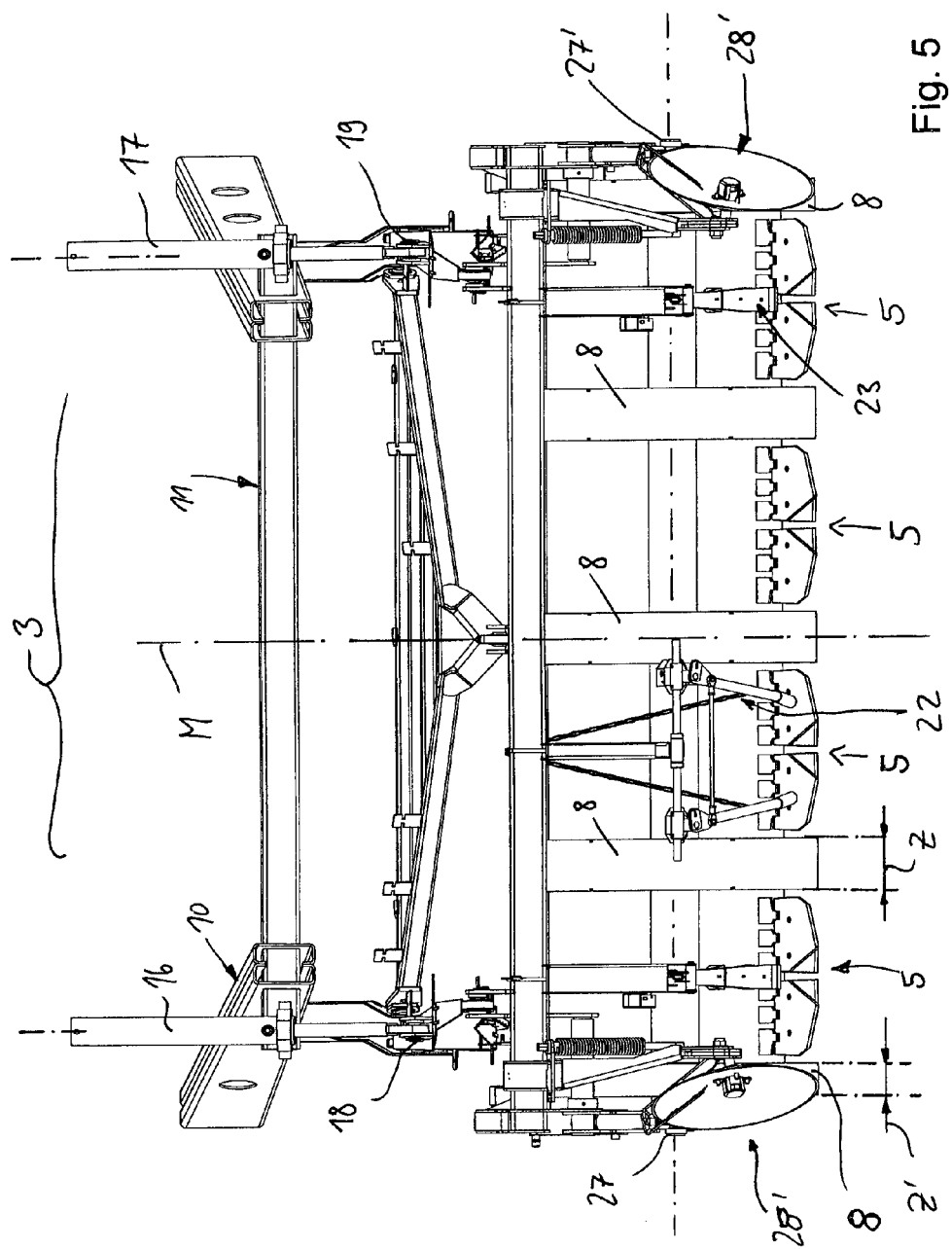
FIG. 5 is a front view of the lifting device according to FIG. 4.

FIG. 1 shows that the wheels 8 in comparison to known sensing rollers or similar support elements have a greater diameter D that can be matched in accordance with the corresponding digging conditions (working height W, FIG. 1), in particular, relative to the height K of the soil ridges 4. In comparison to the height K of the soil ridge 4, the two wheels 8, 8' of guide unit E have a diameter that is several times greater, in particular 2.5 times greater. In this connection, the wheels 8 of the multi-row lifting device 3 are provided in the transverse direction with the same diameter, respectively. The views according to FIGS. 4 and 5 show that the wheels 8 can be provided with different widths Z, Z'.

The construction of the guide unit E provides that between the wheels 8 (support axis Q) arranged in a row transversely to the travel direction F a variable support spacing B is provided that is, in particular, adjustable relative to the spacing of the soil ridges 4 (FIG. 1). The wheels 8 in accordance with the material to be harvested or the contour of the soil ridge can be arranged at different support spacings (not illustrated). It is also conceivable to provide adjusting elements, not illustrated, for adjusting the wheels 8 transverse to the travel direction F so that the wheels 8 by manual or automatic transverse adjustment are supported optimally in the furrow 9 between the ridges 4. In any case, on the soil ridge 4 a lateral guiding action is provided at sides 6, 7 and the mixture G can be guided between the two wheels 8, 8' optimally on a separating stretch into the machine 1 (FIG. 2).

The lifting device 3 has in the travel direction F of the machine 1 rotatable wheels 8 (arrow C) wherein the potato harvester 1 as a whole is moved by means of drive wheels (not illustrated) in the travel direction F. It is also conceivable to provide the wheels 8 with a separate drive unit, not illustrated, so that the actions of the wheels 8, 8' as intake aids (in this connection: lateral pressing of the soil ridge 4 according to arrow S, S' and intake action according to arrow P) can be actively assisted.

The digging share 5 located in the vicinity of the wheels 8 can be adjusted optimally by the guide unit E or a height-adjustable support of the wheels 8 to the height K of the soil ridge 4 and thus to the multi-row digging process (FIG. 2).

FIGS. 3 through 5 show the constructive details of the lifting device 3 provided for this purpose wherein the lifting device is provided with a linkage module 11 connectable to the machine frame 10, on the one hand, and supporting the wheels 8 in the area of the digging shares 5, on the other hand. The wheels 8 are supported to be rotatable in the travel direction F on a transverse axle 12 of the linkage module 11. FIG. 3 shows that the linkage module 11 that is essentially symmetrical to the longitudinal center plane M of the machine 1 is configured as a guiding and linking frame comprised of two guides 13, 14 and a front crossbeam 15.

In this way, the lifting device 3 can be actuated by means of drive elements embodied particularly as lifting cylinders 16, 17 and acting on the guides 13, 14. For a lifting movement according to arrow H (FIG. 2) the lifting device 3 is connected in the area of the guides 13, 14 with a support bearing 18, 19, respectively, to the machine frame 10 such that the lifting movement effects a pivot movement according to arrow R (FIG. 2). In this way, the lifting device 3 as a whole can be lifted, for example, at the edge of a field or during transport.

The side view according to FIG. 2 and the front view according to FIG. 5 illustrate the attachment of the transverse axle 12 supporting centrally the wheels 8 on the linkage module 11. The transverse axle 12 is connected by at least one pivot lever 20 radially extending therefrom to the front area of the linkage module 11 by means of a support bearing 25. By means of this pivot lever 20, the transverse axle 12 can be moved together with the wheels 8 by means of at least one additional lifting member in the form of lifting cylinder 21 (arrow N). The movement of the lifting cylinder 21 is introduced on the short arm 26 of the pivot lever 20, deflected by its support bearing 27, and transmitted onto the support bearing 25 (FIG. 2) so that in particular a positional change of the module E relative to the linkage module 11 takes place (arrow N; FIG. 2).

When looking at FIGS. 3 to 5, it is apparent that for a symmetric configuration of the device 3 the transverse axle 12 is connected at the ends in the area of the support bearing 27, 27' to the linkage module 11 and the lifting members in the form of two parallel lifting cylinders 21, 20 provided as connectors cooperate with the correlated pivot lever 20, 20', respectively, in such a way that the pivoting and adjusting movement according to arrow N is possible. The pivot movement according to arrow N that is effected by a control unit of the machine 1 is utilized in the simplest embodiment as a depth control. During the digging process substantially any position of the lifting cylinder 21, 21' is conceivable. The displacement of the wheels 8 defines in this connection the vertical spacing relative to the digging shares 5 which spacing is effective as the digging depth.

The plan view according to FIG. 4 shows an additional sensing unit 23 that is provided as a module to be placed onto the soil ridges 4 for controlling the lifting device 3 or the digging devices 2 in the area of the wheels 8. It is also conceivable that in the area of the wheels 8 a measuring device 22 is provided with which the lifting depth of the lifting device 3 can be controlled and regulated.

The potato harvester 1 is configured for use in sloped terrain in such a way that the lifting device 3 is pivotable substantially independent of the driver's cabin, the collecting container or similar modules (not illustrated) in the direction according to arrow W' (FIG. 3) about the central longitudinal plane M. The control of the travel direction F in accordance with the extension of the soil ridges 4 can be done manually by the driver of the machine. By means of the measuring device 22, a control or regulation of this process is possible also so that the lateral control of the machine 1 by means of a corresponding measuring signal of the device 22 can be optimized. For this substantially automatic centering on the soil ridge the wheels 8 according to the invention can be used also. In this connection, as a guiding parameter the forces can be utilized that are acting in the direction S, S' (FIG. 1) wherein, by means of appropriate sensors (not illustrated) in the area of the lateral pivot lever 20, 20', lateral loads are detected, respectively, and the lifting device 3 is guided optimally in accordance with the extension of the soil ridges 4 by minimizing the loads.

Figure 6:
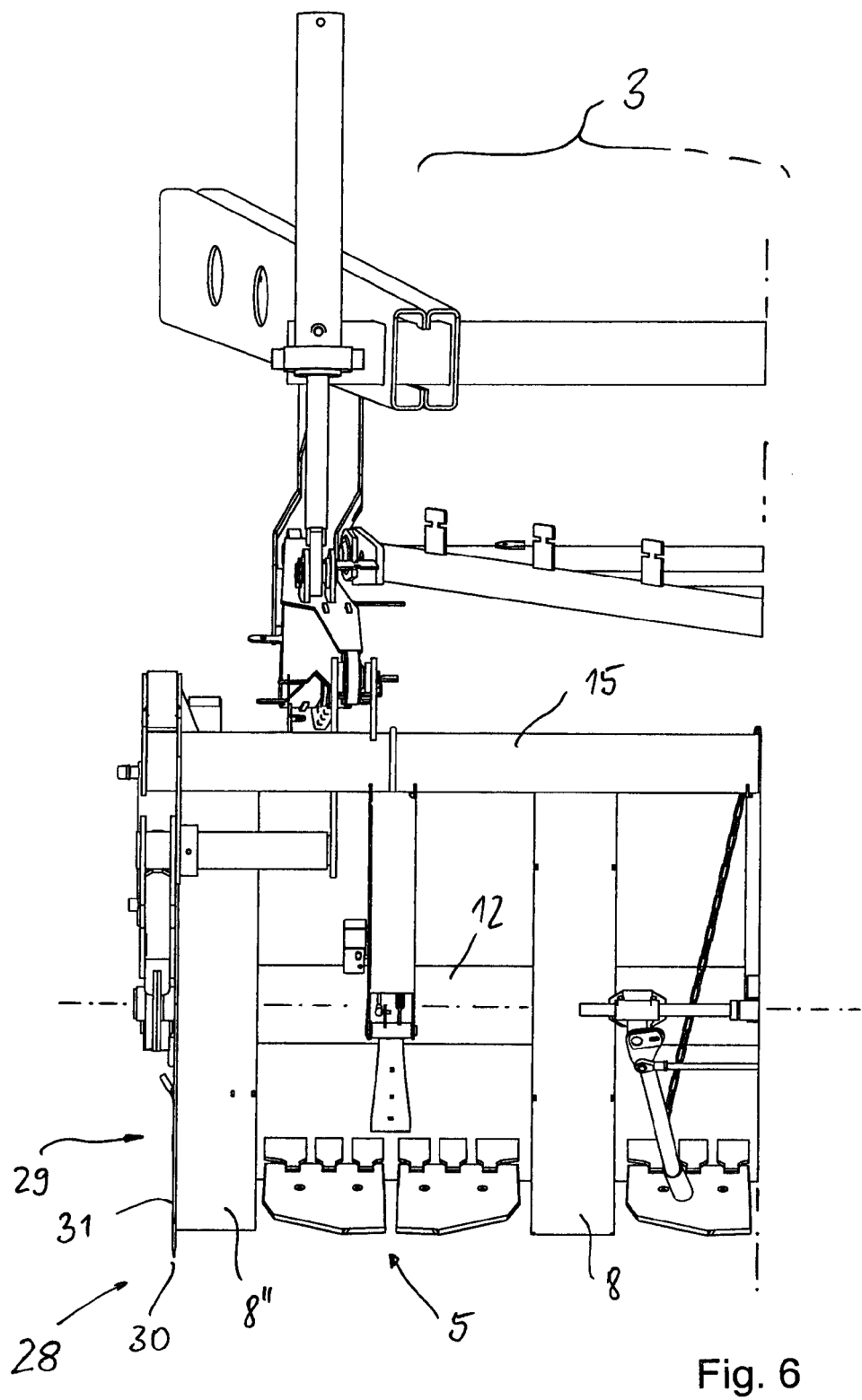
FIG. 6 is a front view similar to FIG. 4 with modified lateral wheels on the lifting device.
Figure 7:
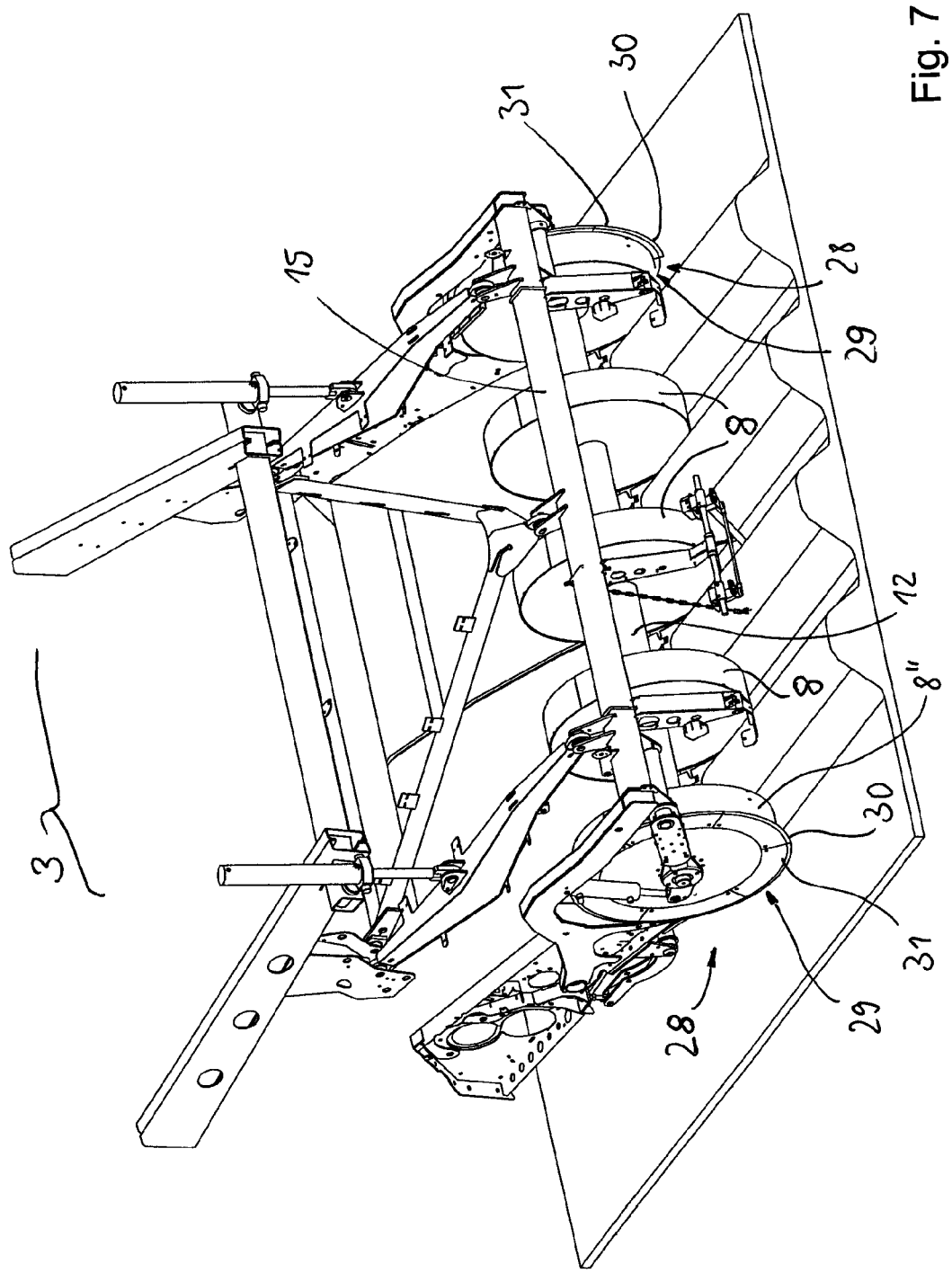
FIG. 7 is a perspective illustration of the lifting device according to FIG. 6.

FIGS. 6 and 7 show another embodiment of the lifting device 3 wherein the lifting device is provided with a cutting member referenced in general at 28 in the area of the two outer wheels 8" (FIG. 5: a coulter disk 28' as a cutting member).

In an advantageous embodiment, as a cutting member 28 a cutting element 29 (FIG. 6) is provided that can be connected directly to the wheels 8" and whose cutting action is thus effected directly by the pressure or weight force according to arrow A (FIG. 2). By means of the cutting element 29 a separation of plant parts such as haulm or the like projecting into the bordering furrow can be cut off. In the perspective illustration according to FIG. 7 it becomes apparent that as a cutting element 29 an annular disk comprised of several parts and provided with a cutting edge 30 is provided. This annular disk 31 is connected directly to the end face of the respective wheel 8" wherein it is also conceivable to arrange an annular disk centrally on the wheel 8" (not illustrated).

In another embodiment of these wheels 8" with cutting member 28 it is conceivable that the wheels 8" directly and/or the correlated cutting member 28 are transversely adjustable (not illustrated) in the direction of the support beam 15 or the transverse axle 12 by a corresponding holder so that in accordance with the harvesting conditions an optimal adjustment of the lifting device 3 is possible.

Figure 8:
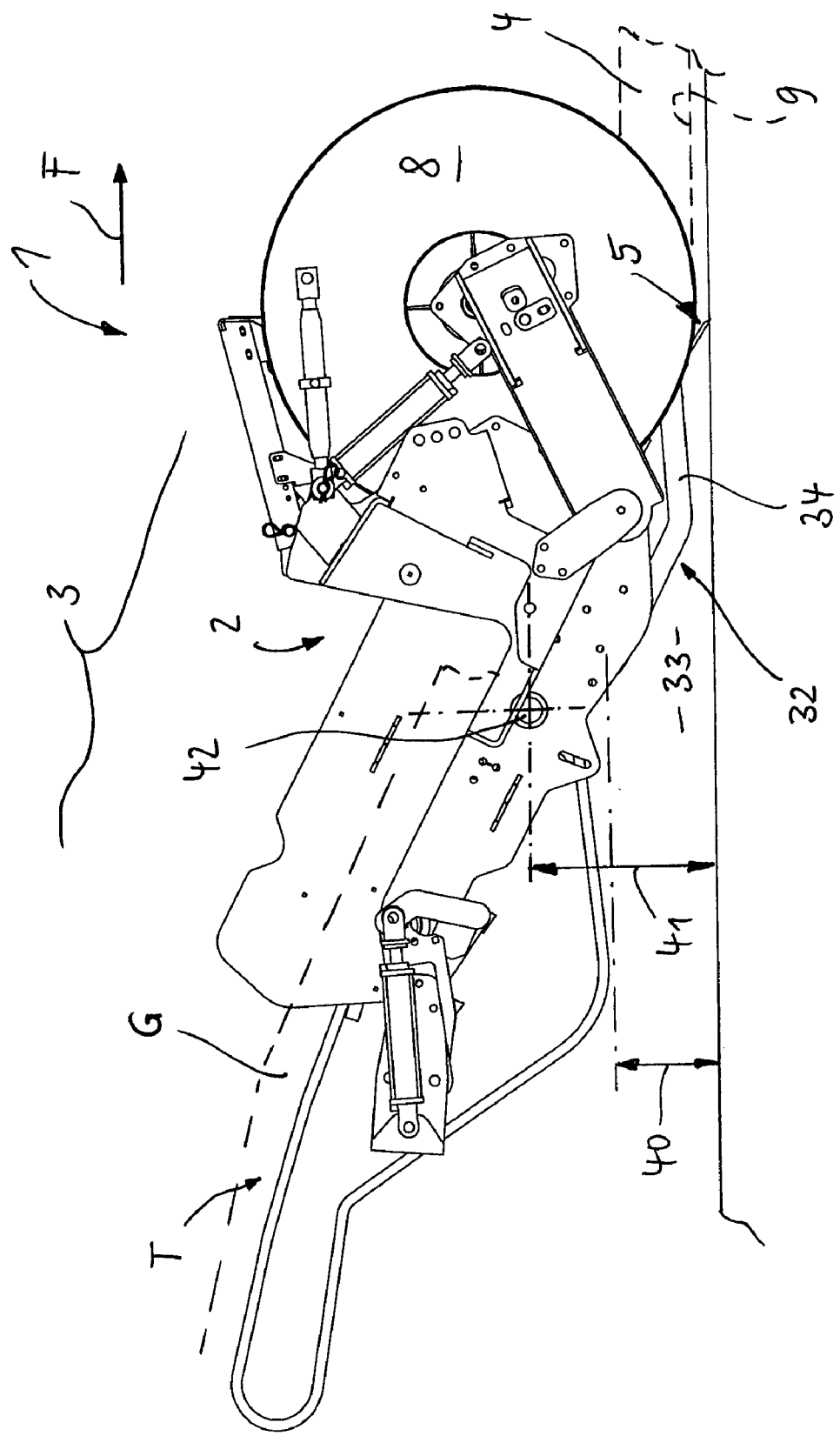
FIG. 8 is a side view similar to FIG. 2 with modified holding means in the area of the digging shares between the wheels.
Figure 9:
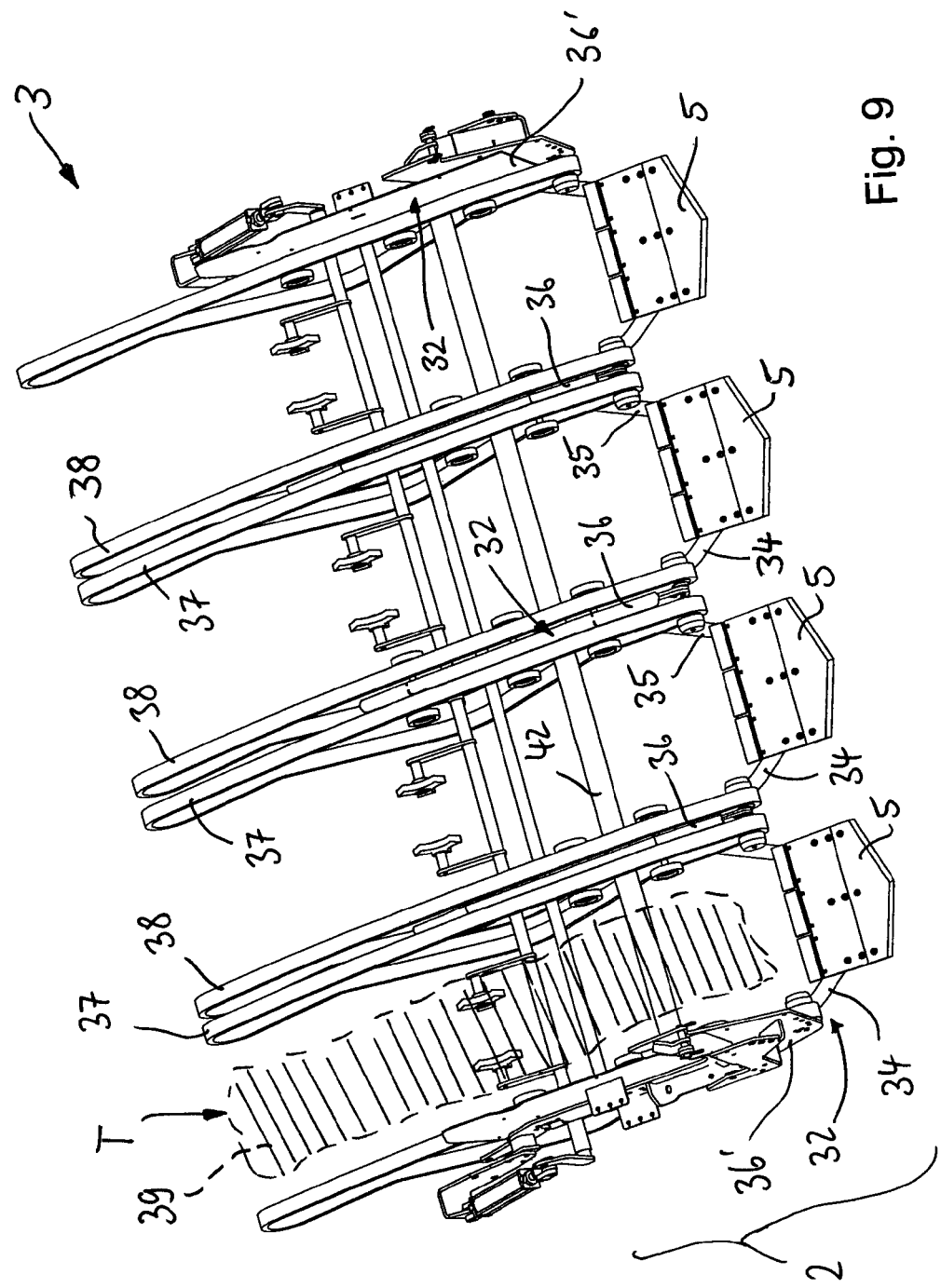
FIG. 9 is a detail view of the lifting device in a plan view with holding means that secure the digging shares, respectively.

FIG. 8 shows in a side view similar to FIG. 2 a lifting device 3 of the potato harvester 1 with essential components. Illustrated is also the advantageous embodiment of holding means in the area of the lifting or digging shares 5. This section of the system is not described in detail in connection with FIG. 2 as it is a generally known part for picking up the mixture G. FIGS. 8 and 9 however illustrate a special configuration of separating stretch T.

The constructively variable holding means 32 for the lifting share 5 in the area of the digging device 2 or the lifting device 3 is designed to modify the area of the harvester facing the ground below the separating stretch T. With this novel mixture conveying embodiment, the risk of collection of soil on individual parts of the harvester as well as a disadvantageous interruption of the harvesting process are to be prevented.

Advantageously, the holding means referenced in general by reference numeral 32 is designed in accordance with FIG. 8 such that in the traveling direction F behind the lifting shares 5 or below their connecting parts to the machine frame 10 (FIG. 2) a comparatively large free space 33 is provided where the screened material can drop essentially freely so that soil deposits on components of the machine arranged downstream of the lifting shares 5 are prevented.

When looking at both FIG. 8 and FIG. 9, it is apparent that two supports arms 34, 35 of the holding means 32, respectively, engage the lifting share 5, respectively. Stays 36 (FIG. 9) are furthermore provided as a simple constructive part providing a connection to the machine frame 10 or linkage module 11 (FIG. 1). These parts 34, 35, 36 enable a raised connecting position (distance 40). When using the potato harvester 1, soil parts or haulm parts or similar material that drop into the free space 33 no longer contact the holding means 32 so that soil deposits on the system that in the past have caused down times of the harvesting machine are prevented.

The plan view according to FIG. 9 (similar to FIG. 5) shows, beginning at the lateral stay 36' at the lateral side of the lifting device 3, several stays 36 of the holding means 32. The stays 36 extend essentially parallel to one another in the direction of the traveling stretch T and connect neighboring lifting shares 5 in the transverse direction. Advantageously, the stays 36 are secured between the drive parts 37, 38 of the conveyor 39 (shown partially as hatching to the left of the drawing FIG. 9). For receiving the stays 36, 36' a support beam 42 is provided which extends at a support height 41 (FIG. 8) that can be advantageously arranged at a large distance above the free space 33.

As a result of the construction with the holding means 32 securing the lifting shares 5, the free space 33 is substantially free of the transverse supports or similar parts (FIG. 1) so that the risk of disturbances and the thus caused downtimes are reduced for the digging device 2 as a whole.

The specification incorporates by reference the entire disclosure of Germany priority document 10 2006 033 974.8 having a filing date of Jul. 22, 2006.

While specific embodiments of the invention have been shown and described in detail to illustrate the inventive principles, it will be understood that the invention may be embodied otherwise without departing from such principles.

What is claimed is:

1. A potato harvester comprising:
   a multi-row lifting device for lifting several soil ridges, wherein the lifting device comprises at least one digging device with digging shares, wherein the digging shares each lift one of the soil ridges;
   at least one support element for supporting the lifting device on the ground;
   wherein the at least one support element comprises wheels;
   wherein a number of the wheels is greater by one than a number of the digging shares, wherein two of the wheels are movable along opposite sides of an intermediately positioned soil ridge, respectively;
   wherein the wheels, relative to a traveling direction of the potato harvester, are positioned at a level of the digging shares and effect in a digging phase of the potato harvester a forced guiding action by providing an intake channel as an intake aid for the intermediately positioned soil ridge dug up by the digging shares.

2. The potato harvester according to claim 1, wherein the wheels form a guide unit that supports at least one part of a weight of the at least one digging device, wherein the guide unit controls the digging shares.

3. The potato harvester according to claim 1, wherein a diameter of the wheels is selected in accordance with digging conditions.

4. The potato harvester according to claim 1, wherein the wheels have a diameter that is greater than a height of the intermediately positioned soil ridge by a multiple.

5. The potato harvester according to claim 1, wherein a diameter of the wheels is identical.

6. The potato harvester according to claim 1, wherein the wheels are arranged in a row transverse to a travel direction of the potato harvester, wherein the wheels have a variable support spacing relative to one another and wherein the support spacing is adjustable to a spacing of the soil ridges.

7. The potato harvester according to claim 6, wherein the wheels are arranged at different support spacings.

8. The potato harvester according to claim 1, wherein the wheels are powered.

9. The potato harvester according to claim 1, wherein the wheels are height-adjustable relative to the intermediately positioned soil ridge.

10. The potato harvester according to claim 1, wherein the wheels are adjustable in a direction transverse to a travel direction of the potato harvester.

11. The potato harvester according to claim 10, wherein the wheels are supported in furrows provided between adjacent soil ridges by being adjusted in the direction transverse to the travel direction.

12. The potato harvester according to claim 1, further comprising a measuring device in the area of the wheels for controlling a lifting depth of the lifting device or of the digging shares.

13. The potato harvester according to claim 1, further comprising at least one sensing unit for contacting at least one of the soil ridges, wherein the at least one sensing unit is arranged in the area of the wheels.

14. The potato harvester according to claim 1, wherein the lifting device has a linkage module, wherein the linkage module connects the lifting device to a machine frame and supports the wheels in the area of the digging shares.

15. The potato harvester according to claim 14, wherein the linkage module comprises a transverse axle, wherein the wheels in a travel direction of the potato harvester are rotatably supported on the transverse axle.

16. The potato harvester according to claim 15, wherein the linkage module is essentially symmetrically configured relative to a longitudinal center plane of the potato harvester, wherein the linkage module comprises a frame having two lateral guides and a leading crossbeam, wherein the lifting device comprises lifting cylinders engaging the guides, respectively, and support bearings provided at a spacing to the lifting cylinders, wherein the lifting device is connected to the machine frame so as to be pivotable by the lifting cylinders and the support bearings.

17. The potato harvester according to claim 15, further comprising at least one pivot lever connected to the transverse axle and extending radially from the transverse axle, wherein the transverse axle is supported on the linkage module by the at least one pivot lever such that the transverse axle centrally supporting the wheels is movable by at least one lifting member.

18. The potato harvester according to claim 17, wherein two of the at least one pivot lever are provided and wherein the transverse axle has ends connected to a bearing of said two pivot levers, respectively, wherein two of the at least one lifting member are provided, wherein said two lifting members are two parallel lifting cylinders connected to said two pivot levers.

19. The potato harvester according to claim 18, further comprising a measuring device for automatically guiding the lifting device along the soil ridges.

20. The potato harvester according to claim 19, wherein the measuring device has sensors for detecting lateral forces acting on at least one of said two pivot levers.

21. The potato harvester according to claim 1, wherein at least outer ones of the wheels interact with a cutting member.

22. The potato harvester according to claim 21, wherein the cutting member is a cutting element located on the wheels.

23. The potato harvester according to claim 21, wherein the cutting element is an annular disk having a cutting edge.

24. The potato harvester according to claim 23, wherein the annular disk is connected directly to an end face of the wheels or centrally on the wheels.

25. The potato harvester according to claim 21, wherein the cutting member is adjustable in at least one direction selected from a direction transverse to the travel direction and a direction of a cutting depth.

26. The potato harvester according to claim 1, further comprising a measuring device for automatically guiding the lifting device along the soil ridges, wherein the wheels interact with the measuring device.

27. The potato harvester according to claim 26, wherein the measuring device has sensors located on supporting parts of the wheels.

28. The potato harvester according to claim 1, wherein the digging shares are supported by holding means extending essentially upwardly to a separating stretch of the potato harvester so that, in a traveling direction of the potato harvester, a free space is formed behind the digging shares and below the holding means.

29. The potato harvester according to claim 28, wherein the holding means comprise support arms and stays, wherein each one of the digging shares is laterally engaged by two of the support arms, and wherein the stays provide a connection to a machine frame of the potato harvester.

30. The potato harvester according to claim 29, wherein the stays are arranged so as to extend in the traveling direction and are positioned between neighboring ones of the digging shares, respectively, that are arranged sequentially behind one another when viewed in a direction transverse to the traveling direction.

* * * * *